US010791089B2

(12) United States Patent
Tripathy et al.

(10) Patent No.: US 10,791,089 B2
(45) Date of Patent: Sep. 29, 2020

(54) CONVERGED ADDRESS TRANSLATION

(71) Applicant: HEWLETT PACKARD ENTERPRISE DEVELOPMENT LP, Houston, TX (US)

(72) Inventors: Aalap Tripathy, Houston, TX (US); Scott J. Hinchley, Houston, TX (US); David Scott Brookshire, Houston, TX (US); Michael Melesse Damena, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 382 days.

(21) Appl. No.: 15/473,088

(22) Filed: Mar. 29, 2017

(65) Prior Publication Data

US 2018/0287996 A1 Oct. 4, 2018

(51) Int. Cl.
*H04L 29/12* (2006.01)
*H04L 12/46* (2006.01)
*H04L 12/741* (2013.01)

(52) U.S. Cl.
CPC ...... *H04L 61/2503* (2013.01); *H04L 12/4641* (2013.01); *H04L 45/745* (2013.01); *H04L 61/2514* (2013.01); *H04L 61/2535* (2013.01)

(58) Field of Classification Search
None
See application file for complete search history.

(56) References Cited

U.S. PATENT DOCUMENTS 7,814,541 B1   10/2010  Manvi
8,194,674 B1 *  6/2012  Pagel ................. H04L 12/4641
                                                    370/393

(Continued)

FOREIGN PATENT DOCUMENTS

EP         3382999 A1 * 10/2018  ......... H04L 12/4641
WO     WO-2006097153 A1    9/2006

(Continued)

OTHER PUBLICATIONS brcd-campus.expert, "Design & Build," Nov. 4, 2011, pp. 1-3, Brocade, Available at: <community.brocade.com/t5/Design-Build/How-To-Configure-Multiple-VLANs-with-the-Same-IP-Address/ta-p/37128>.

(Continued)

*Primary Examiner* — Dhairya A Patel
(74) *Attorney, Agent, or Firm* — Hewlett Packard Enterprise Patent Department (57) ABSTRACT

Example implementations relate to performing converged address translation for devices in a local area network. An example non-transitory computer-readable storage medium stores instructions for performing converged network address translation for devices within a network segmented into multiple VLANs. The instructions when executed by a processing resource of a computing device cause the device to create a local namespace for each VLAN in the network, each local namespace having a list of first level IP addresses unique across all of the created local namespaces. The instructions further cause the processing resource to, for each local namespace, associate a first level IP address from the local namespace's list of first level IP addresses with a static IP address of each device within the respective VLAN and store the associated IP addresses in a routing table for the local namespace. The instructions further cause the processing resource to create a single global namespace for all of the VLANs in the network, the global namespace having a list of second level IP addresses unique within the global namespace. The instructions further cause the processing resource to associate a second level IP address with each first level IP address used within the local namespaces and store the associated IP address in a routing table for the global namespace.

15 Claims, 5 Drawing Sheets

(56) References Cited

U.S. PATENT DOCUMENTS

| | | | |
|---|---|---|---|
| 9,306,910 B2 | 4/2016 | Lambeth et al. | |
| 2002/0087721 A1 | 7/2002 | Sato et al. | |
| 2003/0067926 A1* | 4/2003 | Golikeri | H04L 29/12009 370/401 |
| 2005/0053222 A1* | 3/2005 | Lee | H04M 7/006 379/219 |
| 2005/0111450 A1* | 5/2005 | Miyamoto | H04L 29/06027 370/389 |
| 2005/0111455 A1* | 5/2005 | Nozue | H04L 12/4645 370/392 |
| 2012/0084442 A1 | 4/2012 | Terao | |
| 2012/0250695 A1* | 10/2012 | Jia | H04L 41/0806 370/400 |
| 2017/0034065 A1* | 2/2017 | Iwakura | H04L 49/208 |
| 2017/0041288 A1* | 2/2017 | Stotski | H04L 69/162 |
| 2018/0074841 A1* | 3/2018 | Ravenhill | G06F 9/45558 |
| 2018/0159822 A1* | 6/2018 | Holtzman | H04W 56/001 |

FOREIGN PATENT DOCUMENTS

| | | | | |
|---|---|---|---|---|
| WO | WO-2016159813 A1 * | 10/2016 | | G06F 9/5077 |
| WO | WO-2016209589 A1 | 12/2016 | | |

OTHER PUBLICATIONS

Cisco, "Chapter 11: Configuring Virtual Routing and Forwarding (VRF)," Configuration Management with CiscoWorks LMS 4.0, OL-20718-01, Oct. 30, 2013, pp. 11-1 to 11-40, Available at: https://www.cisco.com/c/en/us/td/docs/net_mgmt/ciscoworks_lan_management_solution/4-1/user/guide/configuration/config/vrf.pdf.

"IPTables connection Tracking", available online at <https://web.archive.org/web/20161114042804/http://www.iptables.info/en/connection-state.html>, Nov. 14, 2016, 15 pages.

Cisco, "Cisco C891F Integrated Services Routers", available online at <https://web.archive.org/web/20150108094821/http://www.cisco.com/c/en/us/support/routers/c891f-integrated-services-routers/model.html>, Jan. 8, 2015, 15 pages.

European Search Report and Search Opinion for EP Application No. 18165151.4, dated Jun. 6, 2018, 8 pages.

Kepware, "KepServerEx", available online at <https://web.archive.org/web/20170203101649/https://www.kepware.com/en-us/products/kepserverex/>, Feb. 3, 2017, 11 pages.

Linux Foundation, "Open vSwitch", available at < http://www.openvswitch.org/>, 2016, 2 pages.

man7.org, Linux, man-pages, "ip-netns—process network namespace management", available online at <https://web.archive.org/web/20160301102423/http://man7.org/linux/man-pages/man8/ip-netns.8.html>, Mar. 1, 2016, 4 pages.

Nuage Network Services Gateway (NSG), "Virtualized Network Services", available online at <https://web.archive.org/web/20160327055537/https://www.nuagenetworks.net/enterprise/virtualized-network-services/>, Mar. 27, 2016, 4 pages.

Openstack, "Network namespaces", available online at <http://docs.openstack.org/newton/networking-guide/intro-network-namespaces.html>, Nov. 21, 2016, 3 pages.

Pablo Neira Ayuso, "The conntrack-tools user manual", Interacting with in-kernel Connection Tracking System, available online at <https://web.archive.org/web/20161120182355/http://conntrack-tools.netfilter.org/manual.html>, Nov. 20, 2016, 17 pages.

Paul Stewart, "VRFing 101, Understing VRF Basics", CCIE 26009 (Security), Jul. 12, 2012, available online at <http://www.packetu.com/2012/07/12/vrfing-101-understing-vrf-basics/>, 16 pages.

Unified Automation, "UaExpert—A Full-Featured OPC UA Client", available online at <https://web.archive.org/web/20160207162814/https://www.unified-automation.com/products/development-tools/uaexpert.html>, Feb. 7, 2016, 3 pages.

Wikipedia, "Virtual Routing & Forwarding" available online at <https://en.wikipedia.org/w/index.php?title=Virtual_routing_and_forwarding&oldid=747776002>, Nov. 4, 2016, 2 pages.

* cited by examiner

| LineID | VLAN ID | Device ID | Source IP | Source Mask | Source Port | Source Gateway | Destination IP | Destination Mask | Destination Port |
|---|---|---|---|---|---|---|---|---|---|
| 141 | 1 | 1 | 192.168.0.11 | 255.255.255.0 | 502 | 192.168.0.254 | 172.17.34.101 | 255.255.0.0 | 1500 |
| 141 | 1 | 2 | 192.168.0.12 | 255.255.255.0 | 502 | 192.168.0.254 | 172.17.34.101 | 255.255.0.0 | 1510 |
| 141 | 1 | 3 | 192.168.0.13 | 255.255.255.0 | | 192.168.0.254 | 172.17.34.102 | 255.255.0.0 | |
| 141 | 1 | 4 | 192.168.0.14 | 255.255.255.0 | | 192.168.0.254 | 172.17.34.103 | 255.255.0.0 | |
| 142 | 2 | 1 | 192.168.0.11 | 255.255.255.0 | 502 | 192.168.0.254 | 172.17.34.110 | 255.255.0.0 | 1500 |
| 142 | 2 | 2 | 192.168.0.12 | 255.255.255.0 | 502 | 192.168.0.254 | 172.17.34.110 | 255.255.0.0 | 1510 |
| 142 | 2 | 3 | 192.168.0.13 | 255.255.255.0 | | 192.168.0.254 | 172.17.34.111 | 255.255.0.0 | |
| 142 | 2 | 4 | 192.168.0.14 | 255.255.255.0 | | 192.168.0.254 | 172.17.34.112 | 255.255.0.0 | |

*FIG. 4*

CONVERGED ADDRESS TRANSLATION

BACKGROUND

A local area network can include multiple devices connected together via one or more network devices, such as switches (layer 2 switches and/or multilayer switches), routers, and/or wireless access points. A network gateway device can connect a local area network to other local area networks and to the Internet. A router or multilayer switch often may serve as a network gateway device.

Network address translation (NAT) is a process of mapping a first Internet Protocol (IP) address space to a second IP address space. NAT is performed on packets as they are in transit between a source device and a destination device. A device performing NAT modifies address information in the packet's header to correspond with translated address information according to the address space mapping. NAT routers are example devices for performing NAT. NAT routers may be used for various reasons, such as due to the inability for devices to have their IP addresses changed due to cost, for network isolation (e.g., keep insecure devices isolated behind a secure NAT router), or for the ability to move devices between different NAT domains. This can be particularly useful in industrial local area (e.g., sensor area) networks.

DETAILED DESCRIPTION

Network address translation (NAT) is a process of mapping a first Internet Protocol (IP) address space to a second IP address space. Port address translation (PAT) is an extension to NAT that permits multiple devices on a local area network to be mapped to a single public IP address. While example embodiments are described herein with respect to NAT, it should be understood that PAT may also be used and thus, the term "NAT" as used herein should be construed to also include "PAT". There are various reasons why it may be desirable to perform network address translation (NAT) on traffic from devices in a local area network (LAN). For example, a network firewall may be deployed to protect the devices within the LAN. In such a case, the source address of the packets may be translated to the address of the network firewall so that traffic from the devices behind the firewall and traffic destined for devices behind the firewall all pass through (and thus may be blocked by) the firewall. In another example, some devices within a LAN may have identical Internet Protocol (IP) addresses. In such a case, NAT may be performed to disambiguate the devices within the LAN.

The problem of duplicate IP addresses is a common one for manufacturing plants. In a typical implementation, the plant may include many Programmable Logic Controllers (PLCs) or Programmable Automation controllers (PACs) constituting various devices used in the manufacturing process (e.g., baggers, weighers, fabric cutters). These devices may run custom ladder logic/state machines to drive and manage the devices' operation in real-time. A microcontroller (part of the PLC unit) generally runs the network stack and may make its state registers/memory-space accessible, such as via Modbus over Transport Control Protocol (TCP)-IP or Modbus over a serial communication standard, such as RS232 and RS485. These devices may be monitored by a Manufacturing Execution System (MES), to perform shop floor optimization (e.g., correlating machine and material usage) to improve production output. Multiple devices and/or larger machines incorporating multiple such devices may constitute a single manufacturing line within the plant. A plant may comprise many manufacturing lines, some of which perform the same functions and some of which perform different functions and thus may comprise a different combination of devices. In one example, a manufacturing plant may include 10-20 manufacturing lines of a given type, where each line includes 8-10 devices or machines.

For simplicity, the devices and machines (referred to herein as "devices") across lines of the same type are often identical. In particular, even the assigned IP address of a given device may be identical to the assigned IP address of a corresponding device in another line. This can occur because the IP addresses are statically configured by the device manufacturer. In other words, each line may have a device with the same IP address as that device in each of the other lines. It can be difficult and costly to change these statically configured IP address of individual devices. But since the lines are within the same LAN, the IP addresses should be disambiguated so that each device can be individually identified within the LAN. Accordingly, each line may have a physical NAT router to NAT translate the device specific network addresses into a factory-wide routable, unique IP address space. However, having a separate physical NAT router for each line can be expensive.

According to examples described herein, the NAT function of multiple physical NAT routers can be converged onto a single device (e.g., a single network gateway device), thus eliminating a need for a physical NAT router per manufacturing line. Furthermore, a unique converged NAT process can be employed that provides a single IP address space with a unique IP address for every device across all the lines, which permits systems and devices outside the LAN to directly address any of the devices within the LAN. Direct management and configuration of each device across the lines may thus be performed, such as by a Supervisory Control and Data Acquisition (SCADA) system or even via a management application implemented on the cloud, in addition to the usual practices of data aggregation, concentration, and analysis. Additionally, other sensor data (e.g., from cameras, temperature sensors) from sensors and devices outside the LAN may be aggregated with the data from the line devices to perform further analysis.

In particular, the converged NAT process may translate the IP addresses of devices in the LAN to a first set of domains, one domain per manufacturing line. The domains may be namespaces provided by the OS kernel of the device (e.g., network gateway device) performing the converged NAT process. For example, the gateway device may use Linux containers to provide the multiple domains. Furthermore, the LAN may be subdivided into multiple virtual local area networks (VLANS), one per line. Thus, each VLAN within the LAN (and thus, each line) may be associated with a respective domain in the first set of domains. Each domain may have its own IP address space, routing table, and routing rules. The IP address of each device in a given line/VLAN may thus be associated with a new, unique IP address in the new domain's address space, which association may be recorded in the routing table. This allows the gateway device to translate the IP address of a packet from a specific device in a line/VLAN to a new, unique IP address in one of the domains of the first set of domains.

Additionally, however, the converged NAT process involves a second level NAT for all traffic passing through the gateway device. After the first level NAT is performed (referred to herein as a local NAT), the converged NAT process translates each of the already translated addresses into a new address in a global domain that is different from any of the domains in the first set of domains. This global domain, which also has its own IP namespace, routing table, and routing rules, provides a unique IP address for all of the devices within any of the manufacturing lines/VLANs of the LAN. Furthermore, the global domain is in a format that is expected or required for communication with other networks outside of the LAN. Accordingly, any packet sent from a device within LAN will be received by the gateway device and will go through a local NAT and a global NAT. At the end of the converged NAT process, the packet's source IP address will be assigned a unique, disambiguated IP address within the global domain suitable for communication with upstream networks. Similarly, any packet from an upstream network destined for a device within the LAN will be received by the network gateway device and will go through the reverse of the converged NAT process, whereby the destination address of the packet is translated according to the global NAT and then according to the local NAT so that it can be directed to the appropriate end device on the appropriate line/VLAN.

An example method for performing converged NAT may be performed by a network gateway device. The network gateway device may receive a first packet from a first device and a second packet from a second device, wherein the first and second device have the same IP address. The gateway device may then translate the first packet's source IP address from the IP address of the first device to a first network address in a first domain. The network gateway device may translate the second packet's source IP address from the IP address of the second device to a second network address in a second domain, wherein the first network address and second network address are different. The gateway device may then translate the first network address and second network address to a third network address and fourth network address in a third domain, wherein the third network address and fourth network address are different. The gateway device may then assign the third network address as the source IP address of the first packet and the fourth network address as the source IP address of the second packet.

An example network gateway device may perform a converged NAT process. The network gateway device may include a downstream port to connect to a trunk port of a switch in a first network. The switch may have a first port connected to a first device in a first VLAN and a second port connected to a second device in a second VLAN, wherein the first device and second device have identical IP addresses. The gateway device may further include an upstream port to connect to devices in a second network. The gateway device may also include a processing resource and a non-transitory computer readable medium storing instructions. The instructions can cause the network gateway device to translate (1) a source IP address of packets received from the first device into a first network address in a first domain and (2) a source IP address of packets received from the second device into a second network address in a second domain. The instructions may further cause the gateway device to translate the first network address and second network address into a third and fourth network address, respectively. The instructions may further cause the gateway device to assign the third network address as the source IP address of packets received from the first device and assign the fourth network address as the source IP address of packets received from the second device.

An example non-transitory computer-readable storage medium may store instructions for performing converged NAT for devices within a network segmented into multiple VLANs. When the instructions are executed by a processing resource of a device, such as a network gateway device, they may cause the gateway device to create a local namespace for each VLAN in the network, each local namespace having a list of first level IP addresses unique across all of the created local namespaces. For each local namespace, a first level IP address from the local namespace's list of first level IP addresses may be associated with a static IP address of each device within the respective VLAN. The associated IP addresses may be stored in a routing table for the local namespace. The device may then create a single global namespace for all of the VLANs in the network, the global namespace having a list of second level IP addresses unique within the global namespace. The device may then associate a second level IP address with each first level IP address used within the local namespaces and store the associated IP address in a routing table for the global namespace. The device may then perform routing of packets received from or directed to the devices in the network using the routing tables in the different namespaces. The process of translating a device's static IP address to the second level IP address and vice versa is an example of converged NAT according to this disclosure.

Figure 1A:
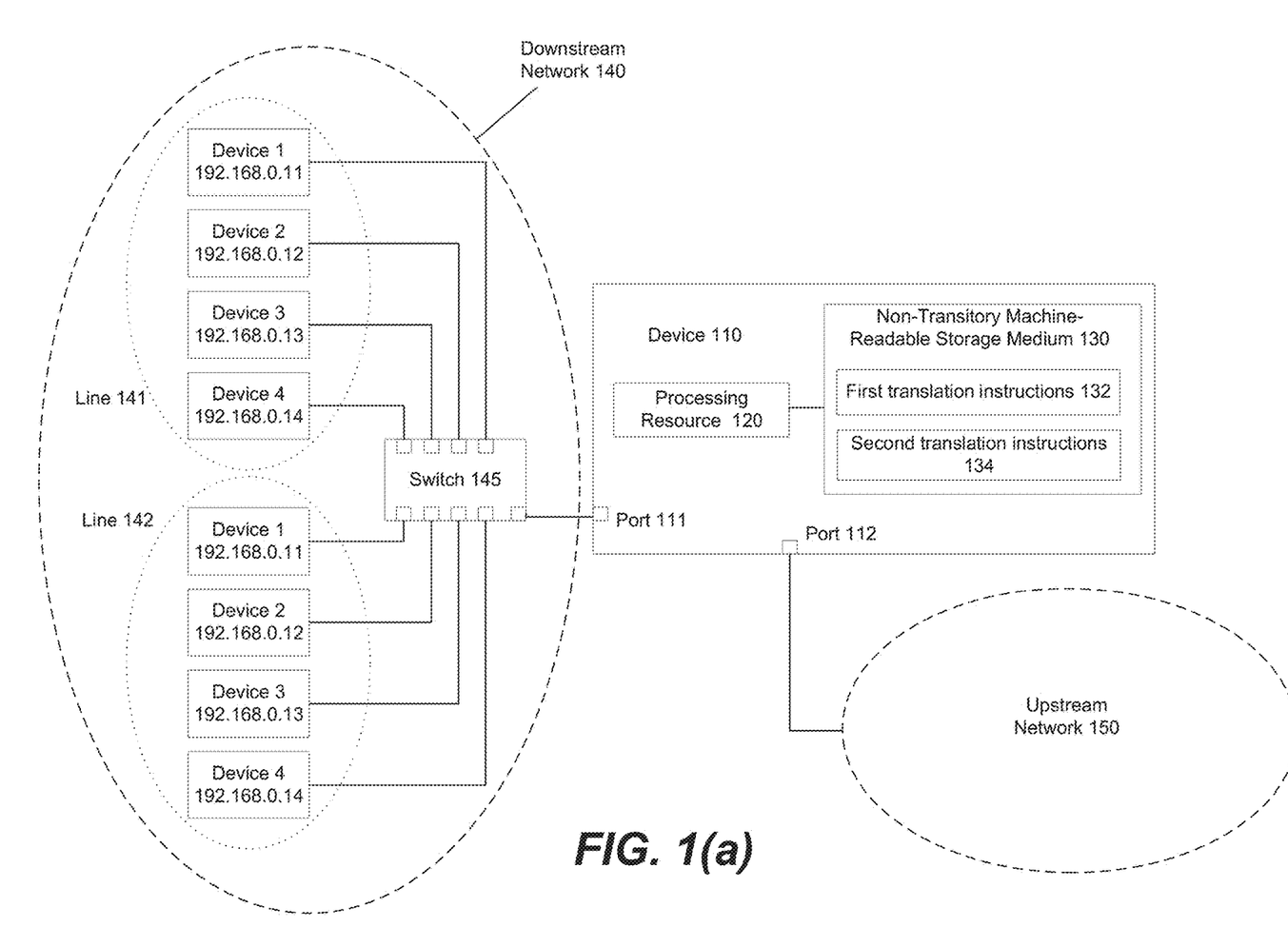
FIG. 1(a) illustrates a device for performing converged network address translation, according to an example.
Figure 1B:
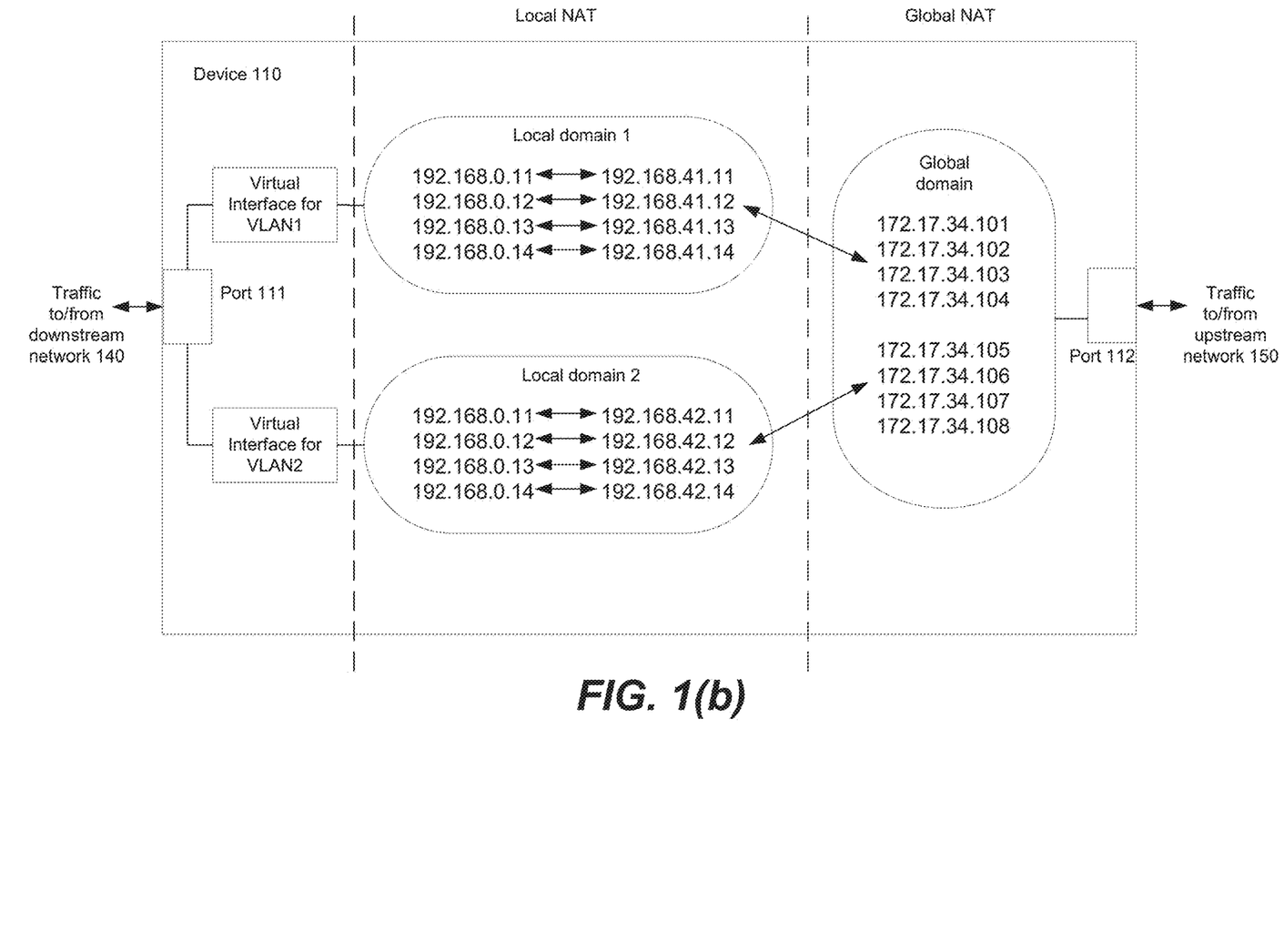
FIG. 1(b) illustrates an example of converged network address translation across multiple domains, according to an example.
Figure 2:
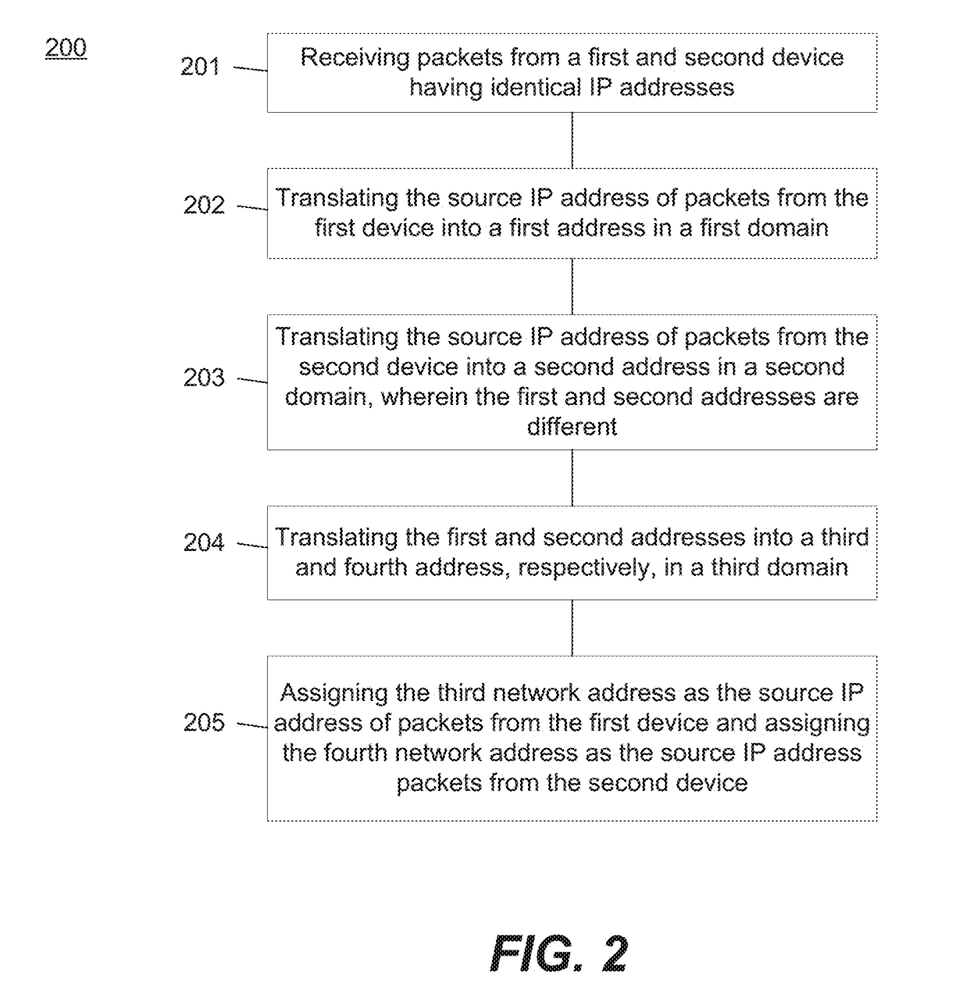
FIG. 2 illustrates a flow chart of an example method for performing converged network address translation on packets destined for an upstream network, according to an example.
Figure 3:
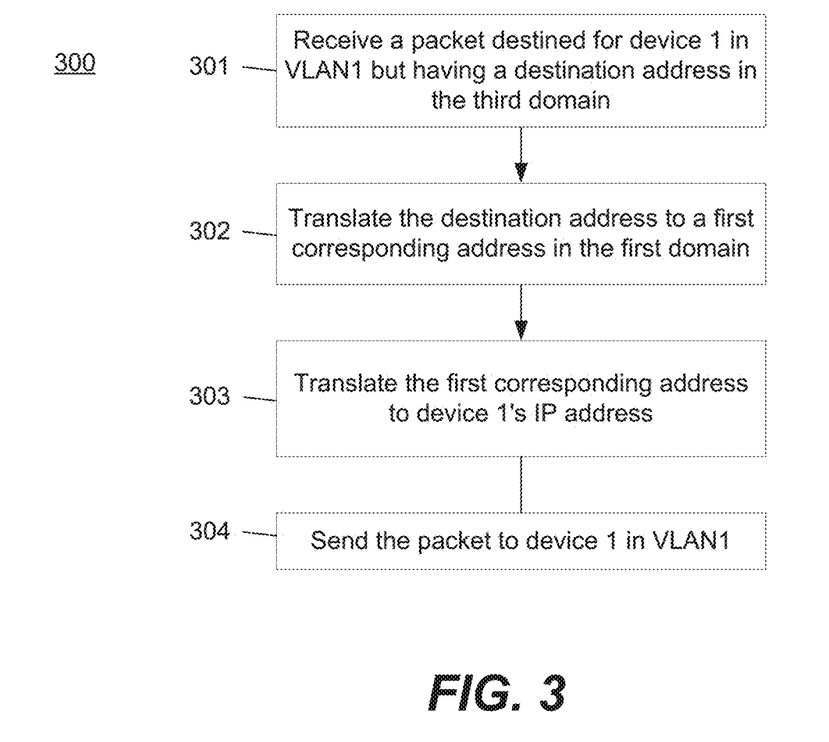
FIG. 3 illustrates a flow chart of an example method for performing converged network address translation on packets received from an upstream network, according to an example.

FIG. 1(a) illustrates an example device 110 for performing converged NAT. FIG. 1(b) illustrates an example of how device 110 can perform the converged NAT between multiple domains. FIGS. 2 and 3 illustrate example methods 200 and 300 for performing converged NAT. Computer-readable instructions for implementing methods 200 and 300 may be stored on a non-transitory computer readable storage medium. These instructions may be executed by a processing resource, such as a processing resource of device 110.

Turning to FIG. 1(a), device 110 is a device configured to perform NAT. For example, device 110 may be a network gateway device. As a network gateway device, device 110 may serve as a gateway for devices within downstream network 140 to provide access to upstream network 150. In other examples, device 110 could be different type of computing device, such as a network controller placed before another device, such as a network gateway, multi-layer switch, or router. For purposes of the examples herein, device 110 will be a network gateway device.

Gateway device 110 may include one or more processing resources 120 and one or more non-transitory machine-readable storage media 130. A processing resource may include one or more central processing unit (CPU), one or more semiconductor-based microprocessor, one or more digital signal processor (DSP) such as a digital image processing unit, other hardware devices or processing elements suitable to retrieve and execute instructions stored in memory, or combinations thereof. The processing resource can include single or multiple cores on a chip, multiple cores across multiple chips, multiple cores across multiple devices, or combinations thereof. The processing resource may fetch, decode, and execute instructions from memory to perform various functions. As an alternative or in addition to retrieving and executing instructions, the processing resource may include one or more integrated circuit (IC), including an application specific integrated circuit (ASIC), a content addressable memory (CAM) or ternary content addressable memory (TCAM), other control logic, other electronic circuits, or combinations thereof that include a number of electronic components for performing various tasks or functions.

The non-transitory machine-readable storage medium 130 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory.

Downstream network 140 is a LAN containing multiple devices, including both endpoints and intermediate network devices. For example, downstream network 140 includes devices 1-4 on line 141 and devices 1-4 on line 142 as endpoints. Downstream network 140 also includes switch 145, which provides network connectivity to the endpoints. Downstream network 140 may include many more devices, such as more devices per line as well as additional lines of devices. Relatedly, switch 145 may have more ports than illustrated to connect to additional devices. Additionally, multiple layers of switches may be deployed. For example, if network 140 is very large with lots of lines and devices, each line or some subset of lines may have its own switch which then connects to another switch that aggregates the traffic from the line switches.

In this example implementation, downstream network 140 is a LAN for devices at a manufacturing plant where multiple devices are organized in lines. As described previously, devices 1-4 in lines 141 and 142 may be PLCs constituting various devices used in the manufacturing process (e.g., baggers, weighers, fabric cutters) with preconfigured IP addresses. Switch 145 may be a layer 2 or multilayer switch with multiple ports. Because devices 1-4 of line 141 have the same IP addresses as devices 1-4 of line 142 (e.g., device 1 on line 141 and device 1 on line 142 have an IP address of 192.168.0.11), switch 145 can be configured to divide the network 140 into multiple subnets, one for each line, in order to disambiguate the IP addresses of the devices across the lines.

In particular, switch 145 may use VLANs to divide network 140 into multiple subnets. For example, switch 145 may assign each line in network 140 to a different VLAN. For example, switch 145 may assign line 141 to a first VLAN and line 142 to a second VLAN. Switch 145 may thus tag any packets received on ports connecting to devices 1-4 in line 141 with an indicator that they belong to the first VLAN and packets received on ports connecting to devices 1-4 in line 142 with an indicator that they belong to the first VLAN. Switch 145 may create additional VLANs for any additional lines as well.

Switch 145 may pass all VLAN-tagged traffic to gateway device 110 via a trunk port of switch 145 to port 111 of gateway device 110. Gateway device 110 may be configured to perform a converged NAT process as described earlier. For example, medium 130 may store instructions for performing converged NAT, such as first translation instructions 132 for performing a first level NAT (i.e., local NAT) and second translation instructions 134 for performing a second level NAT (i.e., global NAT). After performing converged NAT on any traffic received from network 140, gateway device 110 may pass the traffic on to upstream network 150 via port 112. Similarly, any traffic destined for devices in network 140 may be received from upstream network 150 via port 112.

Upstream network 150 may be representative of any number of upstream networks, such as a different network within the manufacturing plant, a data center, and the Internet. For example, a different upstream network within the manufacturing plant may include various systems and devices for managing the devices within downstream network 140 as well as for concentrating, aggregating, and analyzing the data received from the devices. Additionally, a management system/application may reside in a data center (e.g., the cloud). An advantage of the converged NAT process employed by gateway device 110 is that the devices within downstream network 140 may be uniquely identified and addressed by devices outside the network 140 using the assigned IP address from the converged NAT process. Thus, prior workarounds for situations where devices having identical IP addresses need to be disambiguated, such as the Host Identity Protocol, may be avoided.

An example of converged NAT for devices 1-4 of lines 141 and 142 will now be described with reference to FIG. 1(b). Gateway device 110 may create a local domain for each VLAN in the network. In this example, there are two VLANs—VLAN1 and VLAN2, which correspond with line 141 and line 142, respectively. Thus, two local domains are created—local domain 1 and local domain 2. The domains may be namespaces provided by the OS kernel of the gateway device 110, such as via Linux containers. Each domain may have its own IP address space, routing table, routing rules, and interfaces (e.g., virtual interfaces). The IP address space of each domain may comprise a list of first level IP addresses unique across all of the created local domains. Furthermore, the gateway device 110 associates a first level IP address from each local namespace's list of first level IP addresses with a static IP address of each device within the respective VLAN. Thus, for example, within local domain 1 each static IP address (shown on the left-hand side) of devices 1-4 in line 141/VLAN1 is associated with a unique first level IP address (shown on the right-hand side) from local domain 1's IP address space. A similar association is performed for local domain 2. As illustrated, even though the static IP addresses of the devices are duplicated across the different VLANs, the first level IP address assigned to each static IP address is not duplicated across the domains. Thus, each device within network 140 is associated with a unique first level IP address. The static IP address-first level IP address pairs may then be stored in a routing table for the local domain. Translation between the static IP address of the devices and the first level IP address of the local domains is referred to herein as "local NAT".

However, the converged NAT process involves a second level of NAT, referred to herein as "global NAT". This global NAT is performed to translate the first level IP addresses into a format expected/required by the upstream network and can be performed in accordance with standard NAT techniques. The reason this global NAT is not simply applied to the static IP addresses of the devices is because it would result in duplicate IP addresses even after the global NAT. This is because the global NAT process is not designed to disambiguate duplicate IP addresses. Put another way, the global NAT process assumes that disambiguation is not required, which is why workarounds such as deploying multiple physical NAT routers have been used in the past.

In the global NAT, each first level IP address from all of the local domains is associated with a second level IP address in the global domain. The global domain may have its own IP address space, routing table, routing rules, and interfaces. As depicted in FIG. 1(b), each first level IP address in local domains 1 and 2 is associated with a second level IP address in the global domain. For example, 192.168.41.11 is associated with 172.17.34.101, 192.168.41.12 is associated with 172.17.34.102, and so forth. Such associations/mappings are then stored in the routing table for the global domain. As a result, a mapping exists for all devices within network 140, such that each device's static IP address is mapped to a first level IP address in a local domain, which first level IP address is also mapped to a second level IP address in the global domain.

In operation, traffic (i.e., packets) from devices in network 140 is received by gateway device 110 via port 111. This traffic is already VLAN-tagged, such that traffic from devices 1-4 on line 141 is marked with a VLAN1 identifier and traffic from devices 1-4 on line 142 is marked with a VLAN2 identifier. Traffic for each VLAN is directed to the respective local domain via the domain's interface. Thus, for example, gateway device directs traffic from VLAN1 to domain 1 via the virtual interface for VLAN1, and directs traffic from VLAN2 to domain 2 via the virtual interface for VLAN2. Then, the source IP address of a given packet is translated to the corresponding first level IP address. The packet is then passed to the global domain (via another virtual interface, not shown) and the source IP address of the packet (which is currently the first level IP address) is translated to the corresponding second level IP address. The packet is then transmitted out port 112 to the upstream network 150, where it will be directed to its destination (according to the destination IP address of the packet). A similar process, but in reverse, may be performed for traffic received on port 112 from the upstream network.

Turning to FIGS. 2 and 3, methods 200 and 300 are processes that gateway device 110 may follow to perform converged NAT in packets. Method 200 deals with an outbound packet transiting from a device within network 140 to a device in upstream network 150, while method 300 deals with an inbound packet transiting from upstream network 150 to a device within network 140.

Method 200 begins at 201, where gateway device 110 receives packets from a first and second device in network 140 having identical IP addresses. Thus, for example, the first and second devices may be devices on different manufacturing lines within network 140, such as device 1 in line 141 and device 1 in line 142. At 202, gateway device 110 translates the source IP address of packets from the first device into a first address in a first domain. As described above, this translation is made possible by routing the packet into the first domain via a virtual interface for VLAN1. Similarly, at 203, gateway device 110 translates the source IP address of packets from the second device into a second address in a second domain. The first and second IP addresses are unique (i.e., not identical). 202 and 203 thus constitute the local NAT for the packets. At 204, gateway device 110 translates the first and second addresses into a third and fourth address, respectively, in a third domain. The third domain is the global domain. At 205, the third network address is assigned as the source IP address of packets from the first device. Similarly, the fourth network address is assigned as the source IP address of packets from the second device.

Method 300 begins at 301, where gateway device 110 receives a packet destined for device 1 in VLAN1 (i.e., line 141) in network 140. The packet is received from upstream network 150, so the packet's destination address is set as the second level IP address in the third domain (i.e., global domain) corresponding to device 1 in VLAN1. At 302, gateway device 110 translates the destination address to the corresponding first level IP address in the first domain. At 303, gateway device 110 translates the destination address (which is now set as the first level IP address) to device 1's static IP address and adds the VLAN1 identifier. At 304, gateway device sends the packet to device 1 in VLAN1 by transmitting the packet to switch 145 via port 111, which then transmits it to the device.

Figure 4:
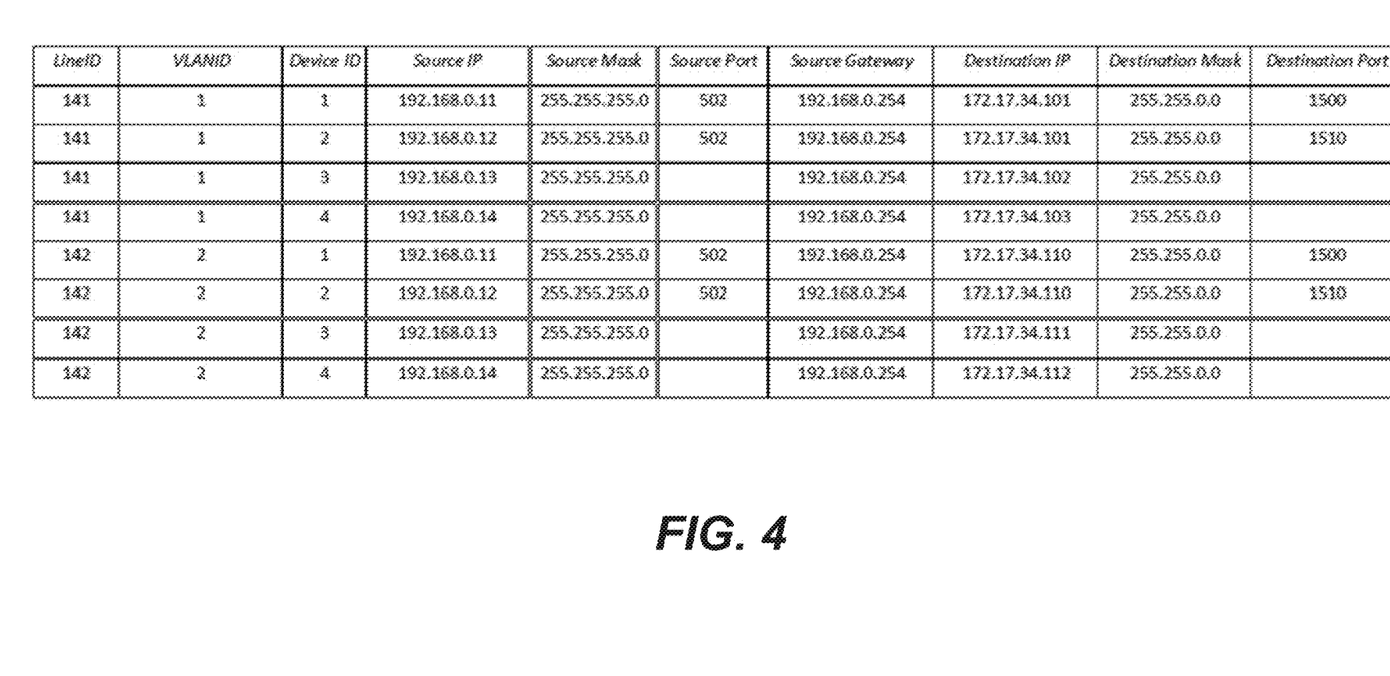
FIG. 4 illustrates an example configuration table for performing converged network address translation, according to an example.

FIG. 4 illustrates an example configuration table for performing converged network address translation, according to an example. In particular, FIG. 4 depicts an example configuration table with some possible mappings of device IP addresses and port addresses to external IP addresses and ports, which may be created using the converged network address translation techniques described herein. For example, device 3 and device 4 of line 141 are presented each as unique external IP addresses—172.17.34.102 and 172.17.34.103, respectively. This external IP address is the fully translated second level (i.e., global) IP address. This is an example of converged address translation involving just NAT. As another example, both device ports 502 of device 1 and device 2 of line 141 are presented externally as a single IP address—172.17.34.101. However, each device is presented on a different port: device 1 is associated with port 1500 while device 2 is associated with port 1510. This is an example of converged address translation involving PAT.

Various modifications may be made to the examples described herein and still be within the scope of this disclosure. For example, an application (e.g., management application, debugging application, security application) executing on the gateway device 110 doing analysis of data from the downstream devices, may utilize the first level (i.e., local) IP addresses instead of the second level (i.e., global) IP addresses. This is because the local NAT table is already providing unique IP translations, so there is no need for the application to utilize the global NAT table. As an additional example, by using namespaces for implementing domains, the application could alternatively be run in the local domain and thus directly utilize the static IP addresses of the devices, instead of using any of the NAT translations. This is possible because the devices corresponding to each local domain do not have identical IP addresses, so each device is individually identifiable using the static IP address. However, the application would be limited to only communicating with a single set of devices (i.e., those within the local domain that the application is operating in).

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the systems and methods of the present disclosure, the specification merely sets forth some of the many possible embodiments, configurations, and implementations. Furthermore, numerous details are set forth to provide an understanding of the system, method, and techniques of the disclosure. However, it will be understood by those skilled in the art that the system, method, and techniques may be practiced without these details. While the system, method, and techniques have been disclosed with respect to a limited number of embodiments, those skilled in the art will appreciate numerous modifications and variations therefrom. It is intended that the appended claims cover such modifications and variations.

What is claimed is:

1. A method for performing converged address translation, comprising:
   receiving, at a network gateway device, a first packet from a first device and a second packet from a second device, wherein the first device and the second device have identical IP addresses;
   translating, by the network gateway device, the first packet's source IP address from the IP address of the first device to a first network address in a first domain, wherein translating comprises determining which first level IP address from a plurality of first level IP addresses unique to the first domain is mapped to a static IP address associated with the first device and corresponding the first network address to the determined first level IP address;
   translating, by the network gateway device, the second packet's source IP address from the IP address of the second device to a second network address in a second domain, wherein the first network address and second network address are different, wherein translating comprises determining which first level IP address from a plurality of first level IP addresses unique to the second domain is mapped to a static IP address associated with the second device and corresponding the second network address to the determined first level IP address;
   translating, by the network gateway device, the first network address and second network address to a third network address and fourth network address in a third domain, wherein the third network address and fourth network address are different and correspond to second level IP addresses unique to a global domain; and
   assigning, by the network gateway device, the third network address as the source IP address of the first packet and the fourth network address as the source IP address of the second packet.

2. The method of claim 1, wherein the first device is assigned to a first VLAN in a local area network and the second device is assigned to a second VLAN in the local area network.

3. The method of claim 2, wherein the translation into the first and second network addresses is performed using a first translation function that outputs distinct network addresses if identical IP addresses are input into the function as long as the identical IP addresses are each associated with a different VLAN.

4. The method of claim 3, wherein the first domain is a first IP namespace including the first plurality of first level IP addresses unique to the first domain and provided by a kernel of the network gateway device and the second domain is a second IP namespace including the second plurality of first level IP addresses unique to the second domain and provided by the kernel of the network gateway device, the first domain being associated with devices assigned to the first VLAN and the second domain being associated with devices assigned to the second VLAN.

5. The method of claim 4, wherein the kernel maintains a first routing table, first network interfaces, and first routing rules for the first IP namespace and a second routing table, second network interfaces, and second routing rules for the second IP namespace.

6. The method of claim 5, wherein the first network interfaces include a first virtual interface between the first VLAN and the first domain and a second virtual interface between the first domain and the third domain, and the second network interfaces include a third virtual interface between the second VLAN and the second domain and a fourth virtual interface between the second domain and the third domain.

7. The method of claim 2, wherein the translation into the third and fourth network addresses is performed using a second translation function that outputs identical network addresses if identical IP addresses are input into the function.

8. The method of claim 7, wherein the third domain is a global namespace applicable to all network traffic received by the network gateway device from devices in the local area network, and the second translation function translates input network addresses into a format expected by a physical connection upstream of the network gateway device.

9. The method of claim 1, further comprising:
   receiving a packet having a destination IP address equal to the third network address in the third domain;
   translating the destination IP address to the first network address in the first domain;
   translating the first network address to the IP address of the first device;
   assigning the IP address of the first device as the destination IP address of the packet; and
   sending the packet to the first device.

10. The method of claim 1, further comprising:
    receiving concurrent messages directed to the first device from different upstream devices; and
    routing each message to the first device.

11. A network gateway device for performing converged network address translation, comprising:
    a downstream port to connect to a trunk port of a switch in a first network, the switch having a first port connected to a first device in a first VLAN and a second port connected to a second device in a second VLAN, wherein the first device and second device have identical IP addresses;

an upstream port to connect to devices in a second network;

a processing resource; and a non-transitory computer readable medium storing instructions to cause the processing resource to:

translate (1) a source IP address of packets received from the first device into a first network address in a first domain, wherein translating comprises determining which first level IP address from a first plurality of first level IP addresses unique to the first domain is mapped to a static IP address associated with the first device and corresponding the first network address to the determined first level IP address, and (2) a source IP address of packets received from the second device into a second network address in a second domain, wherein translating comprises determining which first level IP address from a second plurality of first level IP addresses unique to the second domain is mapped to a static IP address associated with the second device and corresponding the second network address to the determined first level IP address;

translate the first network address and second network address into a third and fourth network address, respectively, wherein the third network address and fourth network address are different and correspond to second level IP addresses unique to a global domain; and assign the third network address as the source IP address of packets received from the first device and assign the fourth network address as the source IP address of packets received from the second device.

12. The network gateway device of claim 11, wherein the first device is one of several devices in a first manufacturing line in the first network and the second device is one of several devices in a second manufacturing line in the first network.

13. The network gateway device of claim 12, wherein there is no physical network address translation router for the devices in the first and second manufacturing lines.

14. The network gateway device of claim 13, wherein the second network includes a management system that is able to directly address the first device via the third network address and directly address the second device via the fourth network address.

15. The network gateway device of claim 11, wherein the first domain is a first IP namespace including the first plurality of first level IP addresses unique to the first domain and provided by a kernel of the network gateway device and the second domain is a second IP namespace including the second plurality of first level IP addresses unique to the second domain and provided by the kernel of the network gateway device, the first domain being associated with devices assigned to the first VLAN and the second domain being associated with devices assigned to the second VLAN.

* * * * *